April 8, 1941.  H. A. LINCH  2,238,024
COMBINED CLARIFIER AND FLOCCULATING APPARATUS
Filed July 30, 1938  3 Sheets-Sheet 1

INVENTOR
HARRY A. LINCH
BY Arthur Middleton
ATTORNEY.

April 8, 1941.  H. A. LINCH  2,238,024
COMBINED CLARIFIER AND FLOCCULATING APPARATUS
Filed July 30, 1938  3 Sheets-Sheet 2
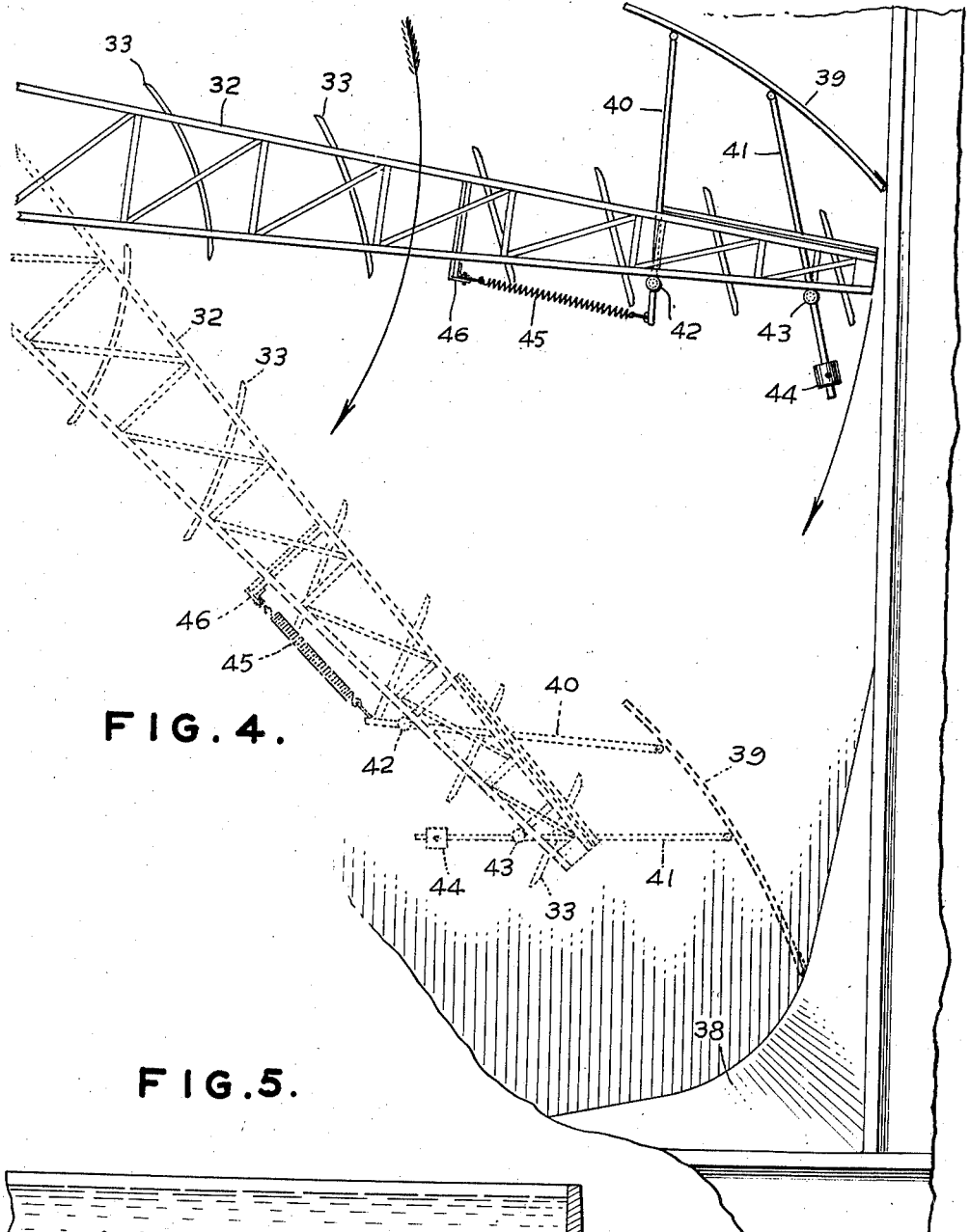
FIG. 4.
FIG. 5.
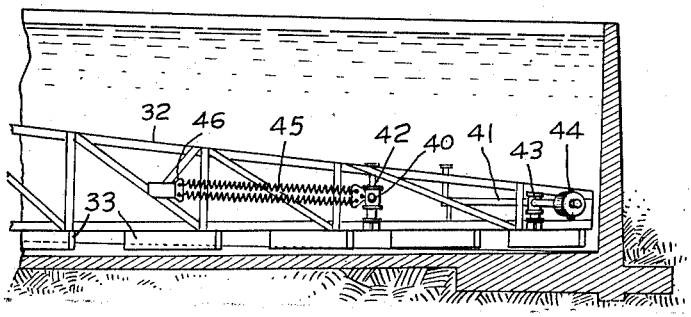
INVENTOR.
HARRY A. LINCH
BY
ATTORNEY.

April 8, 1941.                H. A. LINCH                2,238,024
COMBINED CLARIFIER AND FLOCCULATING APPARATUS
Filed July 30, 1938          3 Sheets-Sheet 3

INVENTOR
HARRY A. LINCH
BY
ATTORNEY.

Patented Apr. 8, 1941

2,238,024

UNITED STATES PATENT OFFICE 2,238,024

COMBINED CLARIFIER AND FLOCCULATING APPARATUS

Harry A. Linch, Mamaroneck, N. Y., assignor to The Dorr Company, Inc., New York, N. Y., a corporation of Delaware Application July 30, 1938, Serial No. 222,107

3 Claims. (Cl. 210—16)

This invention relates to the treatment of turbid liquids that have solid impurities therein, for the purpose of clarifying such liquids. Such liquids are exemplified by impure water, sewage, trade wastes and the like.

Such liquids require treatment in a substantially continuous manner and some of the impurities thereof being colloid-like, require some type of treatment such as flocculation to render the suspended solids settleable. The solids settle continuously in the form of sediment, and in order to have the treatment plant operate continuously, it is desirable to have this sediment continually removed or discharged from its place of deposition.

Accordingly, this invention revolves about a liquid-treatment plant that has as essential components thereof a flocculation zone and a mechanically-cleaned sedimentation zone.

Flocculation may be defined herein as the coagmenting and amassing of suspended solids into integrated flocs and the conditioning of those flocs into settleability by the methods exemplified by the use of bladed paddle assemblies moving in repetitive paths for setting up in the liquid currents sufficient for causing coalescing collisions between the suspended solids strong enough to bring about a multiplicity of such collisions, but gentle enough not to tear apart the fragile coalesced or integrated flocs resulting from those collisions. The currents are also of a type that tend (1) to sweep settled flocs back into suspension for further integration thereof, and (2) to condition or condense the thus-formed flocs to improve their settleability. Thus the flocculation zone is characterized by agitation, whereas the sedimentation zone is characterized by quiescence; therefore we have in these two zones opposing conditions so that the condition of one must not overcome the condition in the other. And yet it becomes quite important to transfer the flocculated liquid from the flocculation zone to the quiescent sedimentation zone under conditions whereby the flocs are drifted from one to the other, because if the flocs are once disintegrated, as by friction, it is all but impossible to reflocculate them. Therefore, an important feature of this invention is the disposing of a particular kind of flocculation zone in such hydraulic communication with a mechanically-cleaned sedimentation zone that suspended flocs are drifted from one to the other without substantial damage thereto and without substantial interference between the flocculating agitation and the quiescence of the sedimentation.

Mechanically-cleaned sedimentation tanks or settlers have been known for many years. They have tended to take embodiment in a round tank in which the sludge-impelling or -raking mechanism slowly travels and sweeps over the bottom of the tank to bring about the discharge of the sludge or sediment therefrom without upsetting the condition of quiescence requisite for sedimentation. Such tanks, having raking blades rotating about a vertical axis, are frequently referred to as "Dorr" clarifiers or thickeners. But when it comes to close juxtaposition of a flocculation zone and settler of this general type, difficulties are encountered, because efficient flocculation zones are usually rectangular in shape and it is not easy to combine a rectangular flocculation zone with a round clarifier. Therefore, another feature of this invention is the combining of a rectangular flocculation zone with a substantially square clarifier, while providing the sludge-raking arms that rotate about a central vertical axis with corner-exploring blades that automatically enter the corners of the square tank to rake sediment therefrom into the path of the blades that are rotating over and sweeping a circular area in the clarifier. This combination has many advantages in that it is cheaper to build, takes less ground space and is highly efficient in the ultimate clarifying of the liquid being treated, because it permits of efficient flocculation and efficient drifting of flocculated liquid to the settler. Also, it gives a maximum of settling area with a minimum of raking mechanism.

In designing a flocculation zone to conform generally to the outline of a rectangular settler, because the liquid to be flocculated must be detained in the flocculation zone for a definite detention period, problems are presented in getting the flocculation zone large enough and in preventing short-circuiting or by-passing of the liquid in incomplete flocculated condition. So another feature of this invention resides in the preventing of this short-circuiting by providing a tortuous flowpath for the liquid passing through the flocculation zone.

The above-described arrangement requires a cross-flow through the settler, that is, feed entering at one end or side and effluent being taken off at the opposite one. Under such circumstances there is a tendency for the feed to short-circuit directly to the overflow. To that end, this invention proposes the use of the final series of flocculating blades for also distributing or dispersing feed in the settler to discourage short-circuiting.

With these objectives, the invention may be said to comprise a tank or basin, in one end section of which is a flocculation zone employing paddle assemblies operating in repetitive paths for treating the flowing-through liquid to cause suspended solids thereof to become integrated flocs conditioned for settleability, whereupon the conditioned flocs are driftingly flowed from the flocculation zone to the sedimentation zone that is in an opposite end section of the rectangular basin. Further features reside in the tortuous flowpath through the flocculation zone for the purpose of assuring better distribution of the flocculated liquid to the settler; the particular paddle arrangement shown in the flocculation zone, where some of the paddles are disposed parallel to the liquid flow and some transverse thereto; and in having some sections of the liquid flowpath wider than others.

With these and other objects in view, the invention consists in the construction and novel combination and arrangement of parts hereinafter fully described, illustrated in the accompanying drawings, and set forth in the claims hereto appended, it being understood that various changes in the form, proportion and minor details of construction, within the scope of the claims, may be resorted to without departing from the spirit of the invention or sacrificing any of the advantages thereof.

Fig. 4 is a detail plan view of the outer end portion of a rotary rake arm in the sedimentation zone of the unit, equipped with corner-exploring device.

Fig. 5 is a side view of mechanism shown in Fig. 4.

Figure 1:
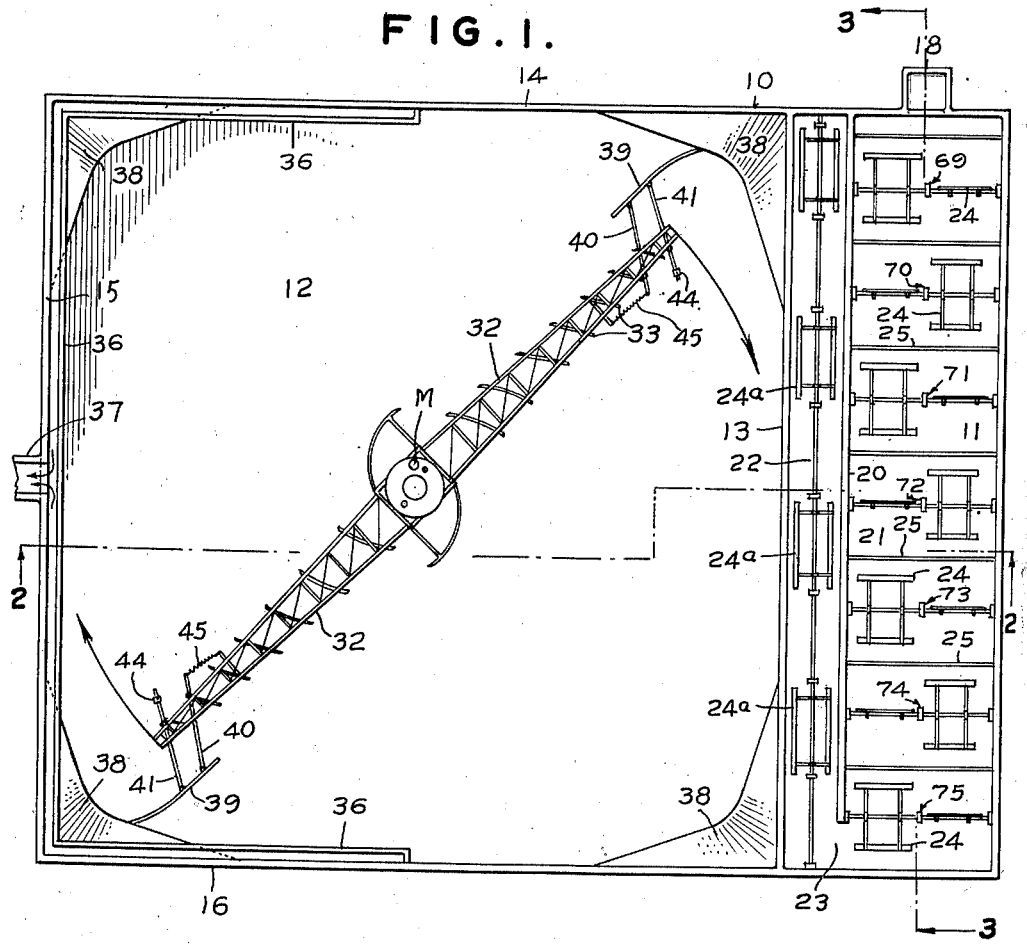
Fig. 1 is a plan view of one embodiment of the flocculation sedimentation unit, with corner-exploring rotary sludge raking arms, and a flocculating zone comprising a plurality of paddle agitated flow sections.
Figure 2:
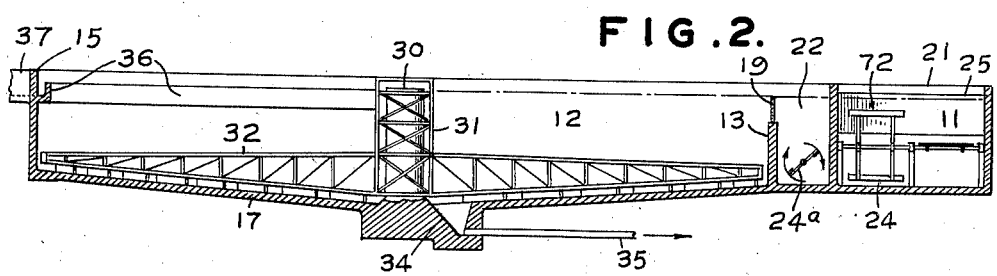
Fig. 2 is a longitudinal section along the line 2—2 of Fig. 1.
Figure 3:
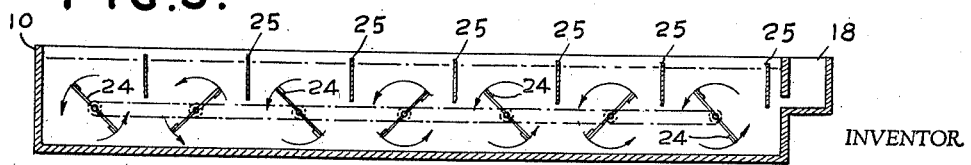
Fig. 3 is a section through the flocculation zone along the line 3—3 of Fig. 1.

In the embodiment of the invention, chosen for the purposes of illustration, and shown in the accompanying drawings, 10 indicates the rectangular tank or basin designed for the clarification of turbid liquids. The tank is subdivided into a flocculation zone 11, and a clarification or sedimentation zone 12, the zone 12 being defined by side-walls 13, 14, 15 and 16, and a bottom 17. The flocculation zone 11 is provided with a feed inlet 18 and an outlet 19 for flocculated liquid to drift into the sedimentation zone or settler 12, the outlet 19 thus constituting influent means for the settler 12. The liquid flowing through the flocculation zone is caused to traverse a tortuous flowpath in which its direction is changed. Such a path in the embodiment shown in Figures 1 to 3, is formed by means of a baffle wall 20 forming one section 21 and another section 22 of the flowpath by way of the end of baffle wall 20 through an opening 23. In this arrangement the flowpath section or channel section 21 is wider than the flowpath section or channel section 22.

The flocculation zone 11, and more particularly the wider section thereof 21, is provided with paddle assemblies 24 adapted to be rotated in repetitive paths by any suitable prime mover. The purpose of these paddle assemblies 24 is to set up in the liquid to be flocculated, currents that have a number of functions,—(1) they must bring about a multitude of collisions between suspended particles of turbidity that are gentle enough to cause the particles to coalesce or coagment or amass into flocs of appreciable size, with the collisions being strong enough to bring this about, but gentle enough not to disrupt or disintegrate fragile flocs once they are formed; (2) to sweep back into suspension and circulation flocs that have become large enough to settle, so that these already-formed flocs can be used as nuclei to which smaller flocs or particles of turbidity may adhere, whereby flocs of increased size are those built up or integrated; and (3) to give such rolling motion to the integrated flocs that they are condensed or conditioned into settleability. These currents are set up by the use of paddles such as are illustrated, especially when such paddles rotate in the same direction, whereby the direction of rotation is such that the paddles, when above their axis of rotation, tend to impel liquid before them away from the feed 18; whereas, the paddles below their axis of rotation tend to impel flocs that have a tendency to settle, or have settled, toward the feed 18. This action can be facilitated by the use of curtain walls or baffles 25, more clearly indicated in Fig. 3, around the end of which liquid flows.

Assuming now that the liquid which continually passes through the opening 23 is substantially flocculated, the problem is presented of passing it into the settler 12 in a manner that (1) its integrated and conditioned flocs are not disrupted, and (2) that they are kept in suspension and prevented from settling; and (3) distributed fairly thoroughly to the settler 12 so that there is no tendency either toward concentration thereof in the feed to the settler through the opening 19, or at a speed that would interfere with the quiescence of the liquid in the settler. Short-circuiting or by-passing is also thus discouraged. This can be accomplished in one way by having the flocculation section or channel section 22 narrower than the main flocculation section or channel section 21, so that the flow-through of the liquid is slightly increased in speed, and the providing therein of a lesser number of paddle assemblies 24a for keeping the flocs in suspension, although other means for accomplishing this purpose are shown in modified embodiments later to be described herein.

In order to control the passage or drift of the flocculated liquid from the narrower section 22, there is provided means for varying the depth of the opening 19 or constricting parts of this opening above the top of the wall 13. These can be planks or other adjustable means, because if the flocculated liquid is caused to flow over a weir, and the weir is not sufficiently submerged, the weir has a tendency to break up the flocs. Therefore the flocculated liquid is being drifted and thoroughly dispersed to the settler 12, having had the particles of turbidity of the liquid first integrated into flocs and then conditioned for settleability, but kept in suspension until the sedimentation zone is reached. The channel sections 21 and 22 are disposed generally at right angles to the general flow path of liquid through the settler 12.

In the settler 12 there is provided an upstanding pier 30 contributing to the support of a cage-drum or other structure 31, adapted to encircle or surround the pier, and that is rotatable by any suitable prime mover M, preferably also deriving its support from the pier 30. The cage 31 carries rake arms 32, preferably in balanced relationship, which arms rotate as a unit with the cage 31. 33 represents raking blades carried by the rake arms 32 in the relationship that when the cage 31 is rotated with its rake arms and blades, the blades sweep over the bottom of the tank in a circular path and impel sediment settled to the bottom of the tank as sludge and made up of solids that were in suspension in the liquid, to a sludge-discharge cone or sump 34, from which they can be removed by a discharge conduit or other discharge means. On the side walls of the tank is provided an effluent launder 36, into which clarified liquid flows to discharge through a clarified-liquid conduit or discharge 37. Thus, as liquid enters the clarifier or settler 12 along the side 13, there is a general liquid flow path thereacross. Sediment that settles in the corners 38 of the tank is raked into the circular path of the rotating or traveling rake arms 32, by means of corner-exploring blades 39, supported from, and carried by, the rake arms 32 by means of a double-link construction 40 and 41. The link 40 is pivoted to the rake arm at 42, and the link 41 is pivoted to the rake arm at 43, the arm 41 having an adjustable counter-balance 44. The rake arm 40 in the embodiment shown herein is acted upon by a spring or springs 45 tied to the rake arm 32 by some suitable connection 46, the spring acting always to cause extension of the corner-explorer 39, whereas the corner-explorer is pushed out of extended position against the spring tension as its end engages with the wall of the settler. Retracted position is shown in full lines in Figure 4, and extended or corner-exploring position is shown in dotted lines. In operation the liquid to be flocculated is continually fed to the inlet 18. It may be previously dosed with some coagulating chemical as is usual in flocculation practice, or if dosing is not required by the liquid being treated such as sewage, this chemical dosing can be omitted. The liquid flows through the flocculation zone, where its turbidity is integrated into flocs and flocculation conditioned after settleability. After passing through the tortuous flowpath of the flocculation zone, the liquid is drifted with its flocs still in suspension, to, and dispersed in, the settler or sedimentation zone 12, under conditions where the agitation of the flocculation zone does not extend to, or interfere with, the quiescence necessary in the sedimentation zone. The liquid in the sedimentation zone or settler 12, being held in quiescence, permits the flocs and other solids in suspension to settle to the floor of the settler in the form of sediment, which is usually called "sludge." Rotation of the rake arms 32, slow enough not to interfere with quiescence, causes the sediment to be impelled to the sludge discharge. Sediment falling in the corners of the square settler is raked therefrom into the circular path of the rake arms 32 and rakes 33, so that the entire bottom of the tank, including the corners, is continually swept substantially clean of sludge, whereby no sludge is left in the tank long enough to become septic, the liquid from which solids and turbidity having thus been removed, continually overflows into the effluent launder 36, and from thence out of the tank through the conduit 37; so here we have an efficient apparatus, rectangular in form, for first flocculating the turbid liquid and settling therefrom settled solids in the form of sludge with the sludge passing from the liquid by one path, and the clarified liquid passing from the apparatus by another path.

Figure 6:
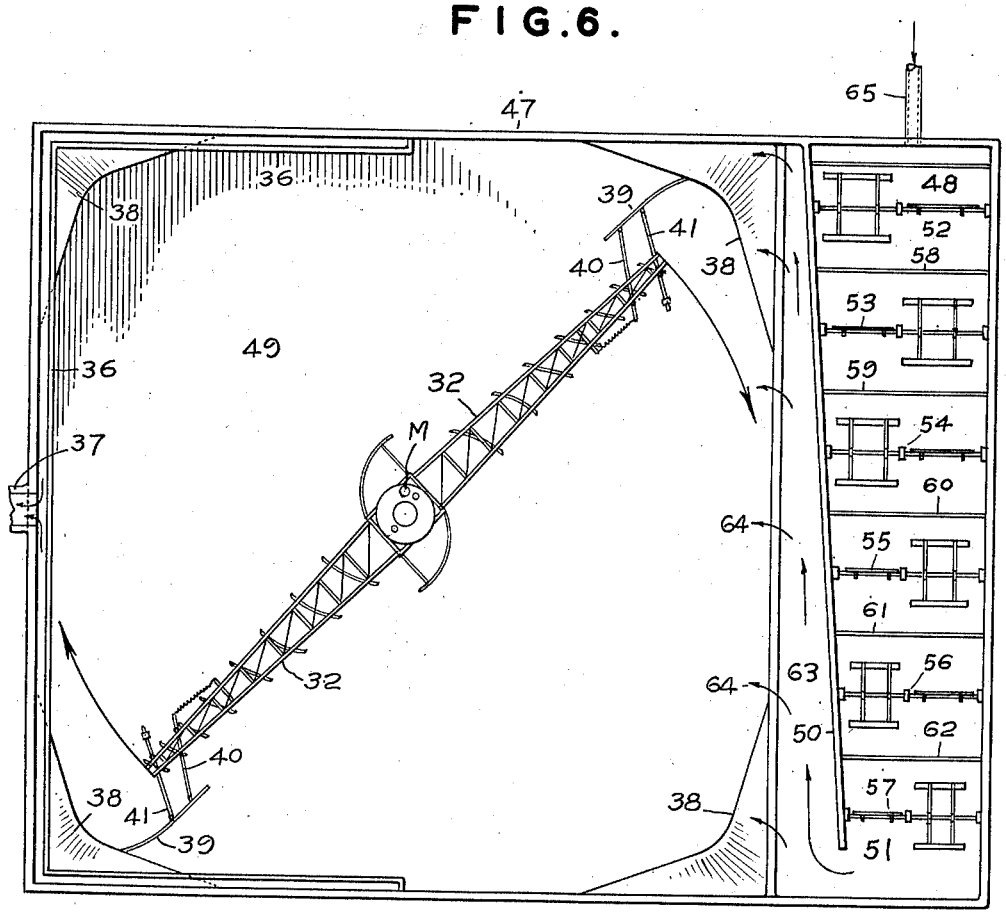
Fig. 6 is a plan view similar to the one of Fig. 1, with the exception that the flocculation zone is modified.

Fig. 6 shows a unit substantially similar to Fig. 1 in its basic rectangular single tank arrangement. Consequently it also comprises a tank 47 in which is disposed a flocculation zone 48 and a sedimentation zone 49. A rotary raking mechanism is herein shown to be the same as the one shown in Fig. 1, and therefore bears the same numerals of description. Some distinction over the Fig. 1 embodiment, however, is found in the arrangement of the flocculation zone 48, in which a baffle wall 50 is disposed at a slope with respect to the confining walls of the flocculation zone. This creates a first-flow section 51 of gradually diminishing width, provided with a series of paddle assemblies 52 to 57, alternating with transverse baffle walls or partial partitions 58 to 62 which function with respect to the paddle assemblies substantially in the manner described in connection with the baffle walls 25 of Figs. 1 and 3. From the first-flow section, and passing around the end of the sloping baffle wall 50, the flowing and flocculating liquid then reverses its flow direction as it enters into a corresponding second-flow section 63 in which no paddles are provided, and which tapers down with regard to effective flow section somewhat in proportion to the diminishing flow volume that drifts off laterally along the width of the tank and into the sedimentation zone 49 in the manner indicated by arrows 64. Thus the flow section 63 serves in effect as a flow transfer section between the first-flow section 62 and the sedimentation zone 49. An inlet for the flocculation zone 48 is indicated at 65.

Figure 7:
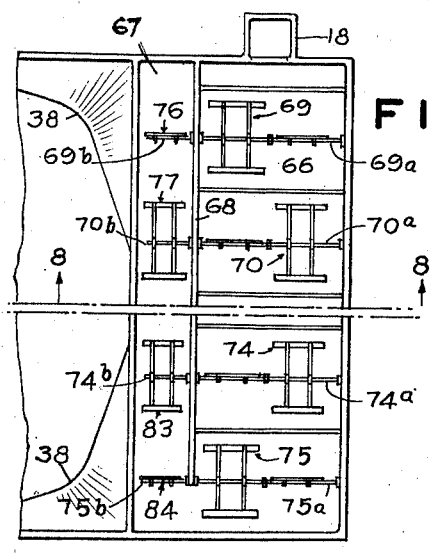
Fig. 7 shows in plan view a modified paddle arrangement in the flocculation zone of a treatment unit according to this invention.
Figure 8:
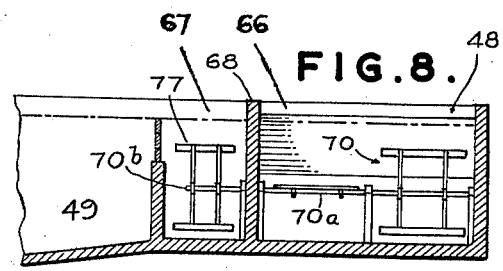
Fig. 8 is a cross-section taken along the line 8—8 of Fig. 7.

Figs. 7 and 8 show a somewhat modified arrangement of paddle assemblies in the flocculation zone; again there are shown a first relatively wider flow section 66 and a second relatively narrower flow section 67, established within the flocculation zone by means of a baffle wall 68. Paddle assemblies 69 to 75 in this case have paddle shafts 69a to 75a which extend through the baffle wall 68 so that the free end portions 69b to 75b of these shafts may carry paddle elements such as indicated by the numerals 76 to 84, preventing the sedimentation of flocculated material in this flow section.

I claim:

1. A liquid clarification apparatus comprising a tank structure having a sedimentation section of substantially rectangular settling area adapted for holding in quiescence liquid having solids in suspension long enough for solids to settle and form sediment in the tank, motivated mechanism for removing sediment from the tank, outflow means for removing clarified effluent from an end portion of the sedimentation section, means for supplying the opposite end portion of the sedimentation section with flocculated liquid, whereby the liquid flows through the sedimentation section in one general direction, which supply means comprises at least two channel sections adapted for liquid flow therethrough, one of which channel sections is wider than the other, and the length of which channel sections extends substantially at right angles to said general direction of flow, a partial partition acting as a common wall between said channel sections and around one end of which partition liquid after having flowed through the wider channel section may pass therefrom to the narrower channel section, said narrower channel section having means to provide influent passage along its length for liquid in substantially uniform distribution into said sedimentation section whereby the liquid flow is distributed substantially uniformly over the width of the settling area.

2. Apparatus according to claim 1, with the addition of means sufficiently agitative to prevent the settling of solids in the narrower channel section.

3. Apparatus according to claim 1, in which the partial partition is disposed at an angle with respect to the walls of the tank structure, so as to gradually diminish the flow cross-section of the wider channel section, as well as of the narrower channel section.

HARRY A. LINCH.